United States Patent
Xu et al.

(10) Patent No.: US 9,005,555 B2
(45) Date of Patent: Apr. 14, 2015

(54) METHOD FOR PREPARING SOLID RUTHENIUM NITROSYL NITRATE

(71) Applicant: Sunshine Kaidi New Energy Group Co., Ltd., Wuhan (CN)

(72) Inventors: Li Xu, Wuhan (CN); Bo Lai, Wuhan (CN); Dechen Song, Wuhan (CN); Qianqian Liu, Wuhan (CN); Yiming Han, Wuhan (CN)

(73) Assignee: Sunshine Kaidi New Energy Group Co., Ltd., Wuhan (CN)

( * ) Notice: Subject to any disclaimer, the term of this patent is extended or adjusted under 35 U.S.C. 154(b) by 0 days.

(21) Appl. No.: 14/475,547

(22) Filed: Sep. 2, 2014

(65) Prior Publication Data
US 2014/0369905 A1  Dec. 18, 2014

Related U.S. Application Data

(63) Continuation-in-part of application No. PCT/CN2013/072105, filed on Mar. 4, 2013.

(51) Int. Cl.
*C01G 55/00* (2006.01)
*C22B 3/00* (2006.01)

(52) U.S. Cl.
CPC .............. *C22B 11/048* (2013.01); *C01G 55/00* (2013.01)

(58) Field of Classification Search
None
See application file for complete search history.

(56) References Cited

FOREIGN PATENT DOCUMENTS

| CN | 101331240 A | * | 12/2008 |
|---|---|---|---|
| CN | 102108444 A | * | 6/2011 |

* cited by examiner

*Primary Examiner* — Melissa Swain
(74) *Attorney, Agent, or Firm* — Matthias Scholl P.C.; Matthias Scholl

(57) ABSTRACT

A method for preparing solid ruthenium nitrosyl nitrate, including: 1) drying a ruthenium-containing spent catalyst, and calcining the spent catalyst, and cooling to room temperature, whereby yielding a ruthenium-containing solid; 2) grinding the ruthenium-containing solid to yield a powder, introducing the powder to a fluidized bed reactor, aerating the fluidized bed reactor with nitrogen or an inert gas, charging hydrogen, whereby yielding ruthenium metal; 3) contacting a mixed gas of ozone and air with the ruthenium metal, whereby yielding gaseous ruthenium tetroxide; 4) introducing the gaseous ruthenium tetroxide into a three-stage absorption plant, whereby yielding an acid solution including ruthenium nitrate; 5) adding a solid of sodium nitrite to the acid solution, stirring, and heating a resulting solution, whereby yielding a solution of ruthenium nitrosyl nitrate; and 6) extracting the solution of ruthenium nitrosyl nitrate with anhydrous ether.

15 Claims, 1 Drawing Sheet

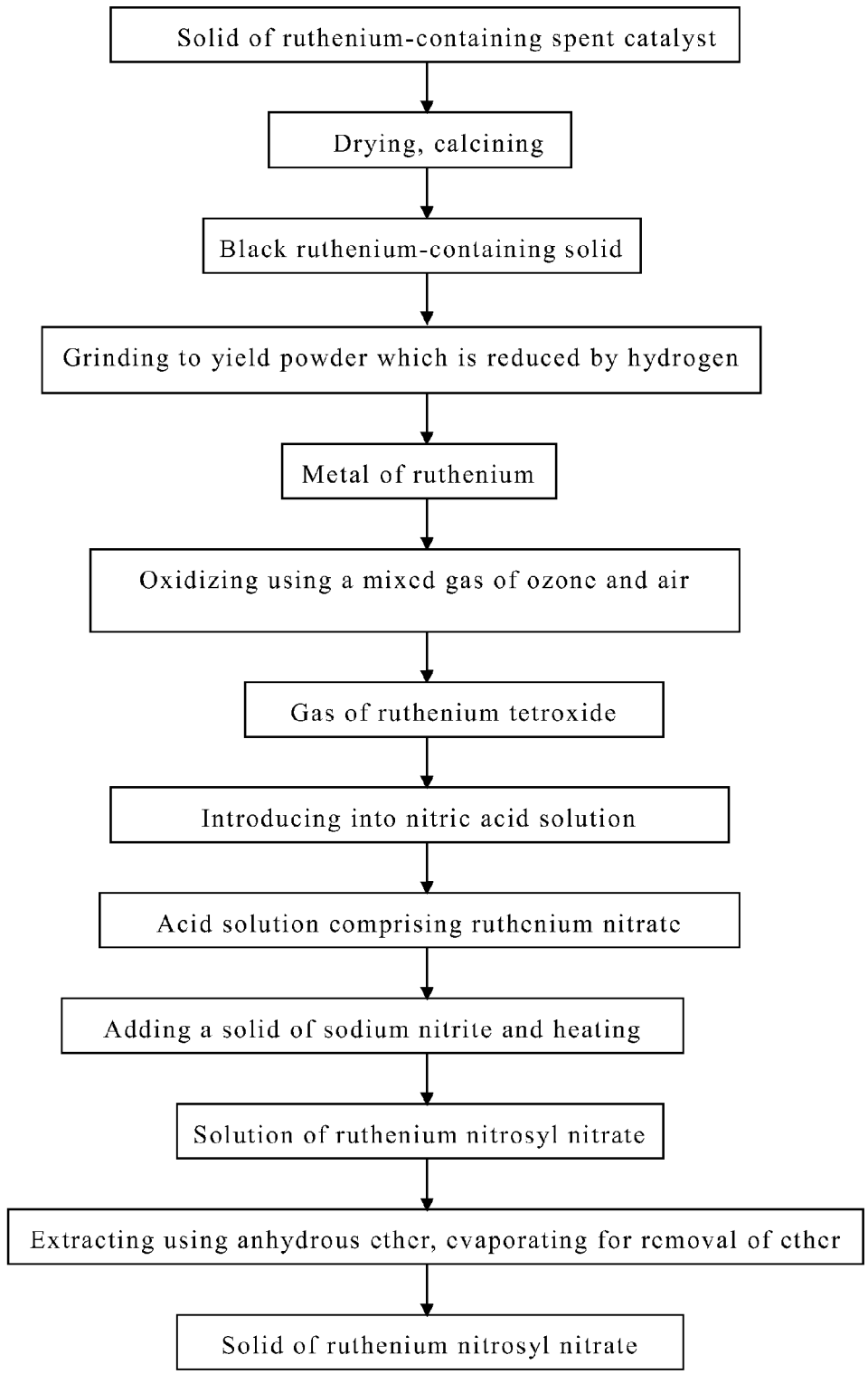

METHOD FOR PREPARING SOLID RUTHENIUM NITROSYL NITRATE

CROSS-REFERENCE TO RELATED APPLICATIONS

This application is a continuation-in-part of International Patent Application No. PCT/CN2013/072105 with an international filing date of Mar. 4, 2013, designating the United States, now pending, and further claims priority benefits to Chinese Patent Application No. 201210055796.1 filed Mar. 5, 2012. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18$^{th}$ Floor, Cambridge, Mass. 02142.

BACKGROUND OF THE INVENTION

1. Field of the Invention

The invention relates to the recycling of a platinum group metal, and more particularly to a method for preparing a solid ruthenium nitrosyl nitrate from a ruthenium-containing spent catalyst.

2. Description of the Related Art

There are two conventional methods for preparing ruthenium nitrosyl nitrate. One is to directly dissolve $RuO_4$ in a cooled nitric acid solution, and the other is to dissolve and reflux nitrosyl ruthenium hydroxide in nitric acid.

In the first method, ruthenium hydroxide or $RuO_2.2H_2O$ is mixed and stirred with micro-boiled nitric acid in a reflux device to yield a nitric acid solution of $Ru(NO)(NO_3)_3$. The nitric acid solution of $Ru(NO)(NO_3)_3$ has high acidity, and thus is difficult to store and transport.

In the second method, ruthenium trichloride and sodium nitrite react to yield an intermediate ruthenium nitrosyl chloride, which is then allowed to react with silver nitrate to yield a solution of ruthenium nitrosyl nitrate. The solution is extracted with ether and the ether extracts are evaporated to yield solid ruthenium nitrosyl nitrate. However, the method has the following disadvantages: 1. A chloride is involved, which poisons the catalyst; 2. The method involves the intermediate, thereby reducing the product yield; 3. ruthenium trichloride is used as crystalline hydrate, which is expensive.

SUMMARY OF THE INVENTION

In view of the above-described problems, it is one objective of the invention to provide an improved method for preparing a solid ruthenium nitrosyl nitrate from a ruthenium-containing spent catalyst. The method is simple and highly efficient and can produce high purity solid ruthenium nitrosyl nitrate from a supported ruthenium-containing spent catalyst. The solid ruthenium nitrosyl nitrate can be used for preparation of a ruthenium catalyst.

To achieve the above objective, in accordance with one embodiment of the invention, there is provided a method for preparing a solid ruthenium nitrosyl nitrate, the method comprises the following steps:

1) drying a ruthenium-containing spent catalyst, and calcining the spent catalyst at a temperature of between 300 and 500° C. for between 2 and 4 hours, and cooling to room temperature to yield a calcined ruthenium-containing solid;

2) grinding the calcined ruthenium-containing solid obtained in step 1) to yield a powder, introducing the powder to a fluidized bed reactor, aerating the fluidized bed reactor with nitrogen or an inert gas for between 0.5 and 2 hours, charging hydrogen, heating the fluidized bed reactor to a temperature of between 100 and 600° C. for a reduction reaction, whereby obtaining ruthenium metal;

3) contacting a mixed gas of ozone and air with the ruthenium metal obtained in step 2), allowing the mixed gas and the ruthenium metal to react at a temperature of between 600 and 650° C., whereby obtaining gaseous ruthenium tetroxide;

4) introducing the gaseous ruthenium tetroxide obtained in step 3) into a three-stage absorption plant comprising a nitrite acid solution, to yield an acid solution comprising ruthenium nitrate;

5) adding a solid of sodium nitrite to the acid solution comprising ruthenium nitrate obtained in step 4), stirring, and heating a resulting solution in the state of micro-boiling reflux, to yield a solution of ruthenium nitrosyl nitrate; and 6) extracting the solution of ruthenium nitrosyl nitrate obtained in step 5) with anhydrous ether, collecting and evaporating an extraction solution for removal of ether, to yield solid ruthenium nitrosyl nitrate.

In a class of this embodiment, in step 1), the ruthenium-containing spent catalyst is dried in the presence of nitrogen or an inert gas at a temperature of 100 and 150° C. for between 1 and 2 hours. The ruthenium-containing spent catalyst is calcined in a muffle furnace.

In a class of this embodiment, in step 2), a flow rate of the hydrogen is preferably between 1200 and 4000 $h^{-1}$, and a reduction time is between 1 and 12 hours, preferably, between 6 and 12 hours. The redox chemical equation is: $RuO_2+2H_2=Ru+2H_2O$.

In a class of this embodiment, in step 3), a flow rate of the mixed gas of ozone and air is between 1200 and 4000 $h^{-1}$, a volume percent of the ozone in the mixed gas is between 1 and 20%, preferably, 15%; and an oxidation time is between 1 and 12 hours, preferably, between 8 and 12 hours. The chemical equation is: $Ru+2O_2=RuO_4\uparrow$, $3Ru+4O_3=3RuO_4\uparrow$.

In a class of this embodiment, in step 4), the nitrite acid solution has a temperature of between 50 and 95° C., a mass concentration of between 45 and 68%, an actual addition thereof is between 1.2 and 2.0 times a theoretical consumption amount calculated on the basis of a ruthenium content in the ruthenium-containing spent catalyst, and the three-stage absorption plant is three brown containers connected in series. The chemical equation is: $2RuO_4+16HNO_3=2Ru(NO_3)_3+8H_2O+5O_2\uparrow+10NO_2\uparrow$.

In a class of this embodiment, in step 5), an actual addition of the solid of sodium nitrite is between 1.2 and 2.0 times a theoretical consumption amount thereof calculated on the basis of a ruthenium content in the ruthenium-containing spent catalyst. The solid of sodium nitrite is slowly added to the acid solution comprising ruthenium nitrate with stirring. A heating time is between 1 and 8 hours, preferably, between 4 and 8 hours. The reaction vessel is a three-necked round bottom flask. The chemical equation is: $Ru(NO_3)_3+2NaNO_2+2HNO_3=Ru(NO)(NO_3)_3+2NaNO_3+NO_2\uparrow+H_2O$.

In a class of this embodiment, in step 6), the extraction with anhydrous ether is carried out for several times for improving the yield of the solid of ruthenium nitrosyl nitrate.

In a class of this embodiment, the ruthenium-containing spent catalyst is a supported catalyst, and a supporter thereof is alumina, silica, zirconia, titania, zeolite, or a combination thereof. The shape of the supporter is spherical, cylindrical, clover-type, four-leaf type, ring type, or honeycomb type.

Advantages of the present disclosure are summarized as follows. 1. The method has low recycling costs, and the resulting solid product is convenient for storage and transportation. 2. The solid ruthenium nitrosyl nitrate contains no halogen, and thus the toxicity is prevented. 3. The method has a simple process and involves no intermediate of ruthenium, which is conducive to improving the product yield. In short, the method has low costs, simple process, high product yield, and the resulting product has high purity, and is suitable for large-scale production.

BRIEF DESCRIPTION OF THE DRAWINGS

The invention is described hereinbelow with reference to an accompanying drawing, in which the sole FIGURE is a flow chart of a method for preparing a solid ruthenium nitrosyl nitrate from a ruthenium-containing spent catalyst according to one embodiment of the invention.

DETAILED DESCRIPTION OF THE EMBODIMENTS

For further illustrating the invention, experiments detailing a method for preparing a solid ruthenium nitrosyl nitrate are described below. It should be noted that the following examples are intended to describe and not to limit the invention.

Example 1

60 g of a ruthenium-containing spent catalyst ($Ru/Al_2O_3$, spherical, comprising 5 wt. % of Ru) was put into a crucible, and transported to a muffle furnace. The furnace was aerated with nitrogen. The catalyst was dried at 120° C. for 2 hours, calcined at 450° C. for 3 hours for removal of organic residues in the spent catalyst, and cooled to room temperature. 58.6 g of a black solid was obtained. The black solid was ground into powders and transported to a fluidized bed reactor. The fluidized bed reactor was aerated first with nitrogen for 30 min, and then with hydrogen having a flow rate of 1200 $h^{-1}$, heated to 300° C. for reduction for 12 hours. The temperature was further increased to 600° C. A mixed gas of ozone and air comprising 15 vol. % of ozone was charged into the reactor, with a flow rate of 1200 $h^{-1}$ for 12 hours, to yield a gas of $RuO_4$. The gas of $RuO_4$ was successively introduced to three absorption bottles each comprising 40 g of 68 wt. % a nitrite acid solution having a temperature of about 75° C., to yield an acid solution comprising ruthenium nitrate ($Ru(NO_3)_3$).

The acid solution comprising ruthenium nitrate was added to a three-necked round bottom flask, followed by 6 g (which is 1.5 times a theoretical consumption amount calculated on the basis of a ruthenium content in the ruthenium-containing spent catalyst) of $NaNO_2$ powder, stirred, and heated for reflux for 8 hours to yield a dark red black solution. The dark red black solution was extracted thrice using 130 mL of anhydrous ether, and an extraction solution was collected and evaporated for removal of ether, to yield 8.84 g of a brown yellow solid, which, based on KBr Pellets-infrared analysis, had a characteristic peak at 1924 $cm^{-1}$, identical to the characteristic structural parameters of $Ru(NO)(NO_3)_3$. The yield of $Ru(NO)(NO_3)_3$ was 96.2%, and metallic impurities were less than 30 ppm.

Example 2

50 g of a ruthenium-containing spent catalyst ($Ru/SiO_2$, cylindrical, comprising 3 wt. % of Ru) was put into a crucible, and transported to a muffle furnace. The furnace was aerated with nitrogen. The catalyst was dried at 120° C. for 2 hours, calcined at 450° C. for 3 hours, and cooled to room temperature. 48.9 g of a black solid was obtained. The black solid was ground into powders and transported to a fluidized bed reactor. The fluidized bed reactor was aerated first with nitrogen for 30 min, and then with hydrogen having a flow rate of 2500 $h^{-1}$, heated to 350° C. for reduction for 10 hours. The temperature was further increased to 620° C. A mixed gas of ozone and air comprising 15 vol. % of ozone was charged into the reactor, with a flow rate of 2500 $h^{-1}$ for 10 hours, to yield a gas of $RuO_4$. The gas of $RuO_4$ was successively introduced to three absorption bottles each comprising 24 g of 60 wt. % a nitrite acid solution having a temperature of about 75° C., to yield an acid solution comprising ruthenium nitrate ($Ru(NO_3)_3$).

The acid solution comprising ruthenium nitrate was added to a three-necked round bottom flask, followed by 3.6 g (which is 1.8 times a theoretical consumption amount calculated on the basis of a ruthenium content in the ruthenium-containing spent catalyst) of $NaNO_2$ powder, stirred, and heated for reflux for 4 hours to yield a dark red black solution. The dark red black solution was extracted thrice using 80 mL of anhydrous ether, and an extraction solution was collected and evaporated for removal of ether, to yield 4.41 g of a brown yellow solid, which, based on KBr Pellets-infrared analysis, had a characteristic peak at 1924 $cm^{-1}$, identical to the characteristic structural parameters of $Ru(NO)(NO_3)_3$. The yield of $Ru(NO)(NO_3)_3$ was 95.8%, and metallic impurities were less than 30 ppm.

Example 3

120 g of a ruthenium-containing spent catalyst ($Ru/ZrO_2$, clover-type, comprising 4 wt. % of Ru) was put into a crucible, and transported to a muffle furnace. The furnace was aerated with nitrogen. The catalyst was dried at 120° C. for 2 hours, calcined at 450° C. for 3 hours, and cooled to room temperature. 118.2 g of a black solid was obtained. The black solid was ground into powders and transported to a fluidized bed reactor. The fluidized bed reactor was aerated first with nitrogen for 30 min, and then with hydrogen having a flow rate of 4000 $h^{-1}$, heated to 350° C. for reduction for 6 hours. The temperature was further increased to 650° C. A mixed gas of ozone and air comprising 15 vol. % of ozone was charged into the reactor, with a flow rate of 4000 $h^{-1}$ for 8 hours, to yield a gas of $RuO_4$. The gas of $RuO_4$ was successively introduced to three absorption bottles each comprising 13 g of 45 wt. % a nitrite acid solution having a temperature of about 75° C., to yield an acid solution comprising ruthenium nitrate ($Ru(NO_3)_3$).

The acid solution comprising ruthenium nitrate was added to a three-necked round bottom flask, followed by 1.29 g (which is 2.0 times a theoretical consumption amount calculated on the basis of a ruthenium content in the ruthenium-containing spent catalyst) of $NaNO_2$ powder, stirred, and heated for reflux for 6 hours to yield a dark red black solution. The dark red black solution was extracted thrice using 60 mL of anhydrous ether, and an extraction solution was collected and evaporated for removal of ether, to yield 1.44 g of a brown yellow solid, which, based on KBr Pellets-infrared analysis, had a characteristic peak at 1924 $cm^{-1}$, identical to the characteristic structural parameters of $Ru(NO)(NO_3)_3$. The yield of $Ru(NO)(NO_3)_3$ was 97.3%, and metallic impurities were less than 30 ppm.

Example 4

60 g of a ruthenium-containing spent catalyst ($Ru/TiO_2$, four-leaf type, comprising 5 wt. % of Ru) was put into a crucible, and transported to a muffle furnace. The furnace was aerated with nitrogen. The catalyst was dried at 120° C. for 2 hours, calcined at 450° C. for 3 hours for removal of organic residues in the spent catalyst, and cooled to room temperature. 58.1 g of a black solid was obtained. The black solid was ground into powders and transported to a fluidized bed reactor. The fluidized bed reactor was aerated first with nitrogen for 30 min, and then with hydrogen having a flow rate of 2000 $h^{-1}$, heated to 350° C. for reduction for 8 hours. The temperature was further increased to 620° C. A mixed gas of ozone and air comprising 10 vol. % of ozone was charged into the reactor, with a flow rate of 1500 $h^{-1}$ for 5 hours, to yield a gas of $RuO_4$. The gas of $RuO_4$ was successively introduced to three absorption bottles each comprising 27 g of 68 wt. % a nitrite acid solution having a temperature of about 75° C., to yield an acid solution comprising ruthenium nitrate (Ru$(NO_3)_3$).

The acid solution comprising ruthenium nitrate was added to a three-necked round bottom flask, followed by 3.56 g (which is 0.9 time a theoretical consumption amount calculated on the basis of a ruthenium content in the ruthenium-containing spent catalyst) of $NaNO_2$ powder, stirred, and heated for reflux for 6 hours to yield a dark red black solution. The dark red black solution was extracted thrice using 100 mL of anhydrous ether, and an extraction solution was collected and evaporated for removal of ether, to yield 8.21 g of a brown yellow solid, which, based on KBr Pellets-infrared analysis, had a characteristic peak at 1924 $cm^{-1}$, identical to the characteristic structural parameters of $Ru(NO)(NO_3)_3$. The yield of $Ru(NO)(NO_3)_3$ was 90.3%, and metallic impurities were less than 30 ppm.

Example 5

60 g of a ruthenium-containing spent catalyst (Ru/$Al_2O_3$-ZSM-5, ring type, comprising 1 wt. % of Ru) was put into a crucible, and transported to a muffle furnace. The furnace was aerated with nitrogen. The catalyst was dried at 120° C. for 2 hours, calcined at 450° C. for 3 hours for removal of organic residues in the spent catalyst, and cooled to room temperature. 59.0 g of a black solid was obtained. The black solid was ground into powders and transported to a fluidized bed reactor. The fluidized bed reactor was aerated first with nitrogen for 30 min, and then with hydrogen having a flow rate of 2000 $h^{-1}$, heated to 350° C. for reduction for 8 hours. The temperature was further increased to 620° C. A mixed gas of ozone and air comprising 15 vol. % of ozone was charged into the reactor, with a flow rate of 3000 $h^{-1}$ for 8 hours, to yield a gas of $RuO_4$. The gas of $RuO_4$ was successively introduced to three absorption bottles each comprising 16 g of 45 wt. % a nitrite acid solution having a temperature of about 75° C., to yield an acid solution comprising ruthenium nitrate (Ru$(NO_3)_3$).

The acid solution comprising ruthenium nitrate was added to a three-necked round bottom flask, followed by 1.2 g (which is 1.5 times a theoretical consumption amount calculated on the basis of a ruthenium content in the ruthenium-containing spent catalyst) of $NaNO_2$ powder, stirred, and heated for reflux for 6 hours to yield a dark red black solution. The dark red black solution was extracted thrice using 50 mL of anhydrous ether, and an extraction solution was collected and evaporated for removal of ether, to yield 1.78 g of a brown yellow solid, which, based on KBr Pellets-infrared analysis, had a characteristic peak at 1924 $cm^{-1}$, identical to the characteristic structural parameters of $Ru(NO)(NO_3)_3$. The yield of $Ru(NO)(NO_3)_3$ was 96.6%, and metallic impurities were less than 30 ppm.

Example 6

160 g of a ruthenium-containing spent catalyst (Ru/$Al_2O_3$—$SiO_2$, honeycomb type, comprising 2 wt. % of Ru) was put into a crucible, and transported to a muffle furnace. The furnace was aerated with nitrogen. The catalyst was dried at 120° C. for 2 hours, calcined at 450° C. for 3 hours for removal of organic residues in the spent catalyst, and cooled to room temperature. 156.4 g of a black solid was obtained. The black solid was ground into powders and transported to a fluidized bed reactor. The fluidized bed reactor was aerated first with nitrogen for 30 min, and then with hydrogen having a flow rate of 2000 $h^{-1}$, heated to 350° C. for reduction for 8 hours. The temperature was further increased to 620° C. A mixed gas of ozone and air comprising 15 vol. % of ozone was charged into the reactor, with a flow rate of 2500 $h^{-1}$ for 8 hours, to yield a gas of $RuO_4$. The gas of $RuO_4$ was successively introduced to three absorption bottles each comprising 8.6 g of 45 wt. % a nitrite acid solution having a temperature of about 75° C., to yield an acid solution comprising ruthenium nitrate (Ru$(NO_3)_3$).

The acid solution comprising ruthenium nitrate was added to a three-necked round bottom flask, followed by 0.64 g (which is 1.5 times a theoretical consumption amount calculated on the basis of a ruthenium content in the ruthenium-containing spent catalyst) of $NaNO_2$ powder, stirred, and heated for reflux for 8 hours to yield a dark red black solution. The dark red black solution was extracted thrice using 30 mL of anhydrous ether, and an extraction solution was collected and evaporated for removal of ether, to yield 0.95 g of a brown yellow solid, which, based on KBr Pellets-infrared analysis, had a characteristic peak at 1924 $cm^{-1}$, identical to the characteristic structural parameters of $Ru(NO)(NO_3)_3$. The yield of $Ru(NO)(NO_3)_3$ was 97.2%, and metallic impurities were less than 30 ppm.

Result Analysis:

As shown in the measurement results in Examples 1-6, the product yields of the method for preparing the solid ruthenium nitrosyl nitrate from a ruthenium-containing spent catalyst all exceed 90%, and under preferable reaction conditions, the product yield reaches 95% and more. The method effectively utilizes waste resources of ruthenium, and has low costs, simple process, and high product yield. The resulting product has high purity, and is suitable for large-scale production.

Unless otherwise indicated, the numerical ranges involved in the invention include the end values.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:
1. A method for preparing solid ruthenium nitrosyl nitrate, the method comprising the following steps:
 1) drying a ruthenium-containing spent catalyst, calcining the spent catalyst at a temperature of between 300 and 500° C. for between 2 and 4 hours, and cooling to room temperature, whereby yielding a calcined ruthenium-containing solid;

2) grinding the calcined ruthenium-containing solid obtained in step 1) to yield a powder, introducing the powder to a fluidized bed reactor, aerating the fluidized bed reactor with nitrogen or an inert gas for between 0.5 and 2 hours, charging hydrogen, heating the fluidized bed reactor to a temperature of between 100 and 600° C. for a reduction reaction, whereby yielding ruthenium metal;

3) contacting a mixed gas of ozone and air with the ruthenium metal obtained in step 2), allowing the mixed gas and the ruthenium metal to react at a temperature of between 600 and 650° C., whereby yielding gaseous ruthenium tetroxide;

4) introducing the gaseous ruthenium tetroxide obtained in step 3) into a three-stage absorption plant comprising a nitrite acid solution, whereby yielding an acid solution comprising ruthenium nitrate;

5) adding a solid of sodium nitrite to the acid solution comprising ruthenium nitrate obtained in step 4), stirring, and heating a resulting solution in the state of micro-boiling reflux, whereby yielding a solution of ruthenium nitrosyl nitrate; and 6) extracting the solution of ruthenium nitrosyl nitrate obtained in step 5) with anhydrous ether, collecting and evaporating an extraction solution for removal of ether, whereby yielding a solid ruthenium nitrosyl nitrate.

2. The method of claim 1, wherein in step 1), the ruthenium-containing spent catalyst is dried in the presence of nitrogen or an inert gas at a temperature of 100 and 150° C. for between 1 and 2 hours.

3. The method of claim 1, wherein in step 2), a flow rate of the hydrogen is between 1200 and 4000 $h^{-1}$, and a reduction time is between 1 and 12 hours.

4. The method of claim 3, wherein in step 2), the reduction time is between 6 and 12 hours.

5. The method of claim 1, wherein in step 3), a flow rate of the mixed gas of ozone and air is between 1200 and 4000 $h^{-1}$, a volume percent of the ozone in the mixed gas is between 1 and 20%, and an oxidation time is between 1 and 12 hours.

6. The method of claim 5, wherein in step 3), the volume percent of the ozone in the mixed gas is 15%, and the oxidation time is between 8 and 12 hours.

7. The method of claim 1, wherein in step 4), the nitrite acid solution has a temperature of between 50 and 95° C., a mass concentration of between 45 and 68%, an actual addition thereof is between 1.2 and 2.0 times a theoretical consumption amount calculated on the basis of a ruthenium content in the ruthenium-containing spent catalyst, and the nitrite acid solution is loaded in three brown containers connected in series.

8. The method of claim 1, wherein in step 5), an actual addition of the solid of sodium nitrite is between 1.2 and 2.0 times a theoretical consumption amount thereof calculated on the basis of a ruthenium content in the ruthenium-containing spent catalyst, and a heating time is between 1 and 8 hours.

9. The method of claim 8, wherein in step 5), the heating time is between 4 and 8 hours.

10. The method of claim 1, wherein the ruthenium-containing spent catalyst is a supported catalyst, and a supporter thereof is alumina, silica, zirconia, titania, zeolite, or a combination thereof.

11. The method of claim 2, wherein the ruthenium-containing spent catalyst is a supported catalyst, and a supporter thereof is alumina, silica, zirconia, titania, zeolite, or a combination thereof.

12. The method of claim 4, wherein the ruthenium-containing spent catalyst is a supported catalyst, and a supporter thereof is alumina, silica, zirconia, titania, zeolite, or a combination thereof.

13. The method of claim 6, wherein the ruthenium-containing spent catalyst is a supported catalyst, and a supporter thereof is alumina, silica, zirconia, titania, zeolite, or a combination thereof.

14. The method of claim 7, wherein the ruthenium-containing spent catalyst is a supported catalyst, and a supporter thereof is alumina, silica, zirconia, titania, zeolite, or a combination thereof.

15. The method of claim 9, wherein the ruthenium-containing spent catalyst is a supported catalyst, and a supporter thereof is alumina, silica, zirconia, titania, zeolite, or a combination thereof.

* * * * *